May 15, 1962 W. TYPROWICZ 3,034,432
WORK SUPPORTS
Filed Feb. 25, 1959 3 Sheets-Sheet 2
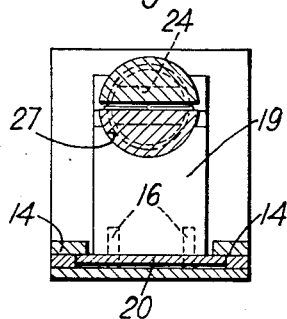
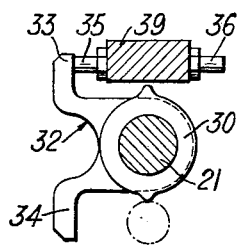
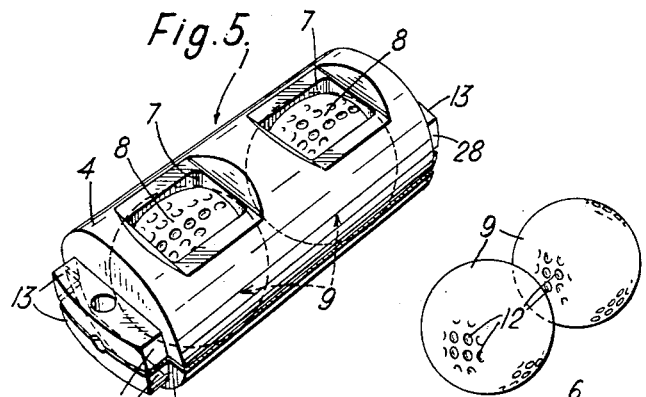
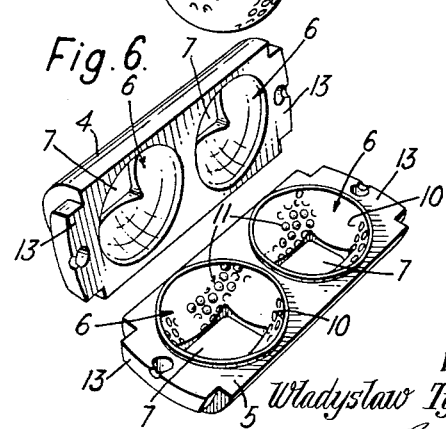
Inventor
Wladyslaw Typrowicz
By Bacon & Thomas
Attorneys

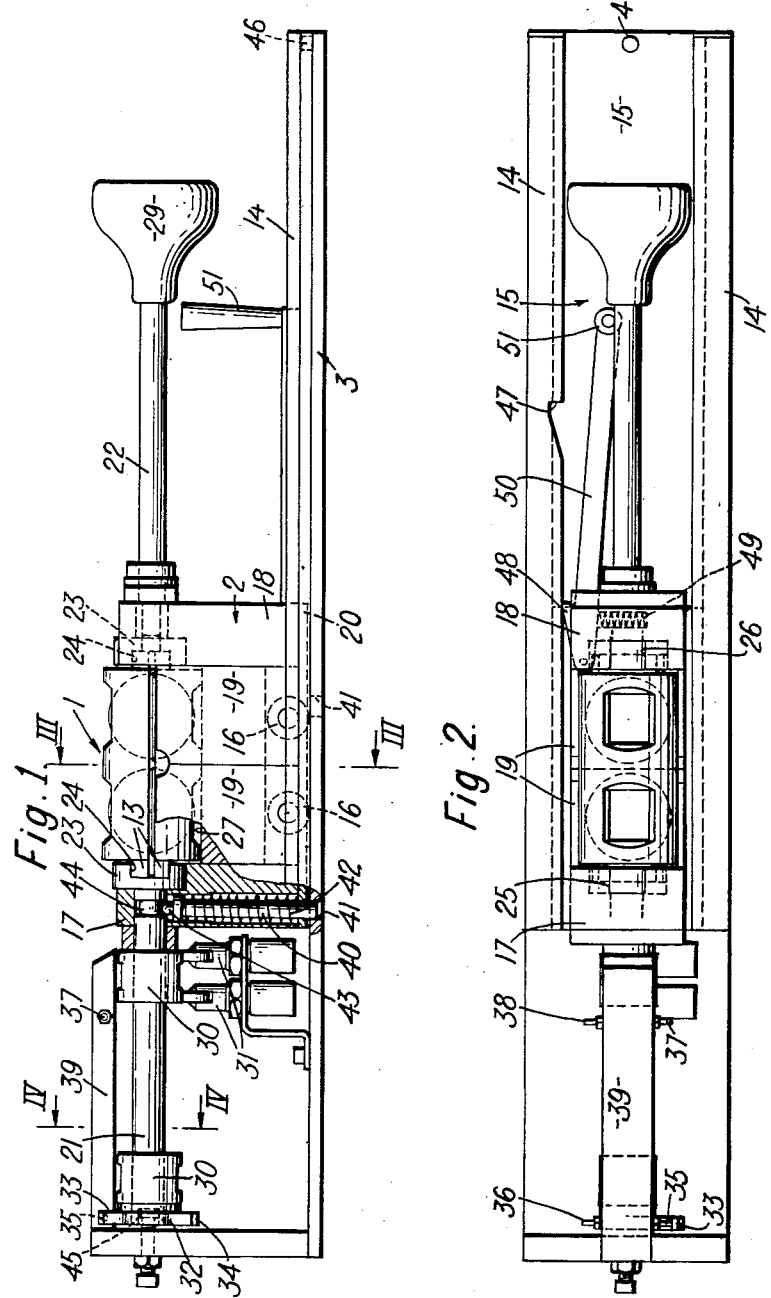

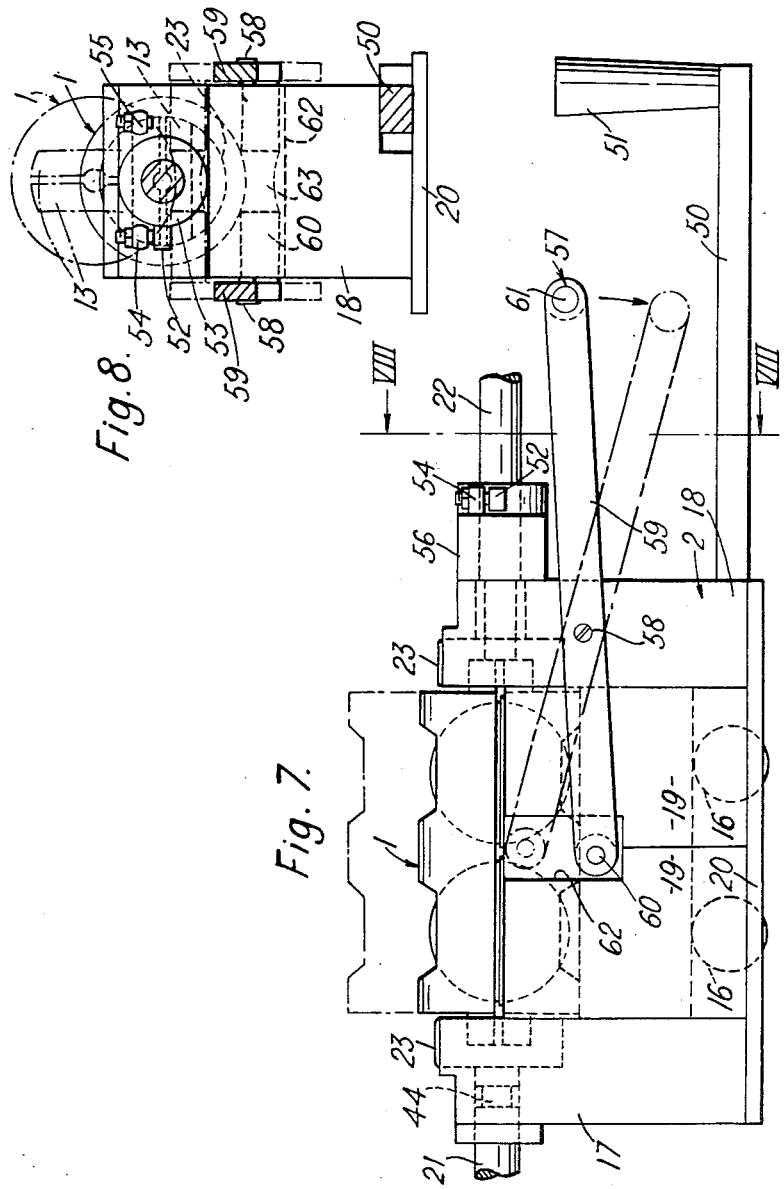

United States Patent Office 3,034,432
Patented May 15, 1962

3,034,432
WORK SUPPORTS
Wladyslaw Typrowicz, Shirley, Croydon, England, assignor to Masson Seeley & Company Limited, London, England, a British company
Filed Feb. 25, 1959, Ser. No. 795,503
Claims priority, application Great Britain Feb. 28, 1958
10 Claims. (Cl. 101—407)

This invention relates to work supports suitable for use in conjunction with marking presses. Such presses often involve the transfer of pigment or other coloring matter from a carrier to the work-piece in a pressing operation either with or without the application of heat.

It is sometimes desired to mark a three-dimensional work-piece in this way at two or more surface areas thereof spaced around its periphery and hitherto this has been done by repositioning the work-piece on the support by hand for each marking operation. This method is slow and cumbersome and it is an object of the present invention to provide a work support which will enable this operation to be performed more quickly and efficiently.

Thus according to the invention there is provided a work support for use in conjunction with a marking press, including a work holder adapted to support in fixed relationship thereto a three-dimensional work-piece for a marking operation on at least two surface areas thereof spaced around its periphery, said work holder being rotatably mounted so as to enable each said peripheral area to be presented in turn for marking, means being provided for locating the work holder in predetermined angular positions corresponding to the marking positions of the work-piece.

It can be seen that operation of the work support according to this invention involves only an initial positioning of the work-piece in relation to the work holder whereafter marking at the different areas of the workpiece is effected by simple rotation of the holder from one predetermined angular position to another, thus rendering unnecessary any manual repositioning of the work-piece itself in relation to the support and consequently increasing the rate at which an operator can carry out marking operations.

Any suitable means may be provided for defining the predetermined angular positions of the work holder. Thus, for example, where an article is to be marked at two areas only, stops may be provided limiting rotation of the holder in both the clockwise and anti-clockwise direction so as to define angular positions of the holder corresponding to the two marking positions of the workpiece. Alternatively, spring-detent arrangements may be employed to define the marking positions of the holder.

The form of the holder will be dictated by the form of the article to be marked. Thus, for example, for tubular articles a cylindrical support or mandrel will be required to support such articles thereon. For solid articles a work holder which is openable to receive therewithin the work-piece will be provided. Such an openable work holder can take many forms. For example, such a work holder may comprise two or more parts capable of complete separation or hinged together.

Moreover the work holder may be removable from the work support for mounting the work-piece thereon or therewithin prior to marking and for removing it after marking. Alternatively, the work holder may be permanently associated with the work support so far as operation of the support is concerned.

If desired ejector mechanism may be provided for facilitating removal of the work holder from the work support.

Obviously, where an openable work holder is provided within which the work-piece is to be mounted, such work holder will be provided with openings, windows, cut-away portions or the like to reveal the surface to be marked.

It is preferred to mount the work holder upon a carriage movably mounted in its turn upon a bed-plate, two main stops being provided for defining limiting positions of the carriage on the bed-plate. In use, the support will be positioned so that one of said limiting positions is a marking position, i.e. when the carriage is in that position, a work-piece will be correctly positioned beneath the die for the marking operation to take place. The other limiting position can then be used as a loading and unloading position.

If a plurality of impressions have to be made at each surface of the work-piece to be marked, e.g. for the purpose of building up a design in a plurality of colours, then one or more intermediate and releasable stops may be provided for defining one or more intermediate positions of the carriage at which additional marking operations can take place, the intermediate stops being effective in one direction of movement only of the carriage relative to the bed-plate. Such an arrangement of carriage and bed-plate is described and claimed in British patent specification No. 716,884.

It is preferred to provide locking means actuatable consequent upon rotation of the work holder to its predetermined angular positions whereby in such positions the carriage is locked relative to the bed plate. In a preferred embodiment a cam-operated spring-biased plunger is employed as the locking means and engages a recess provided therefor in the bed-plate to lock the carriage relative thereto. The locking means is preferably such that rotation of the work holder to the said predetermined angular positions is only possible with the carriage in its marking position or positions.

The work support according to the invention also preferably includes electrical switch means actuatable consequent upon rotation of the work holder to the said predetermined angular positions thereof, whereby such rotation may be employed automatically to operate the marking press.

In order that the invention may be fully understood, two preferred embodiments thereof will now be described by way of example only, with reference to the accompanying drawings in which:

FIG. 1 is a side elevation of a work support according to the invention including a work holder adapted to support two golf-balls for marking on diametrically opposed faces, part of the support being broken away in section to reveal constructional details;

FIG. 2 is a top plan view of the work support;

FIG. 3 is a sectional view on the line III—III of FIG. 1;

FIG. 4 is a detail sectional view on the line IV—IV of FIG. 1;

FIG. 5 is a perspective view of the work holder;

FIG. 6 is a perspective view of the work holder opened with the balls removed;

FIG. 7 is a fragmentary side elevation of a modified form of the work support of FIGS. 1 to 6; and FIG. 8 is a sectional view on the line VIII—VIII of FIG. 7.

Referring to the drawings, the work support comprises an openable two-part work holder 1, a carriage 2 and a bed-plate 3.

The work holder 1 comprises two substantially identical and wholly separable parts 4, 5 (FIGS. 5 and 6), which are segmental in transverse cross-section. The flat faces of the two parts have two pairs of complementary spherically-shaped recesses 6 formed therein. Windows or apertures 7 are provided in the parts opening into the base of each such recess to reveal the surfaces 8 to be marked on golf-balls 9 held between the parts 4, 5.

In each of the recesses 6 in the part 5 there is mounted a cup 10 having an aperture in the base thereof in register with the opening in the part 5. These cups 10 are provided on their inner surfaces, which engage the balls 9, with raised pimples 11 shaped and disposed so as to mate with the indentations 12 normally provided in the surface of a golf-ball.

Lugs 13 are provided at each end of both parts 4, 5 of the holder for mounting the holder on the carriage 2 as will be more fully explained hereafter.

The bed-plate 3 includes side rails 14 which define therebetween a track 15 in which the carriage 3 runs on roller bearings 16 mounted in the base of the carriage.

The carriage 2 comprises two outer pillars 17, 18, and intermediate members 19 all rigidly secured together by suitable means (not shown) and all mounted on a base plate 20. The roller bearings extend through the plate 20 to support the carriage on the bed-plate 15. The carriage also includes two shafts 21, 22 journalled respectively in the pillars 17, 18. These shafts are in axial alignment and their inner ends each carry a support member 23 for the work holder.

The support members 23 for the work holder are each cylindrical in shape and have a diametrically disposed slot 24 therein, of a width suitable just to receive the pair of lugs 13 at the end of the assembled work holder. The support members are mounted in cylindrical recesses in the inwardly-facing surfaces of the pillars 17, 18 which recesses are open at the tops of the pillars at 25, 26.

The intermediate members 19 of the carriage are shaped to provide an upwardly facing semi-cylindrical bearing surface 27 for the work holder when mounted between the support members 23. Moreover, the end faces 28 (FIG. 5) of the lugs 13 are cylindrically-shaped and the lugs of such length that the faces 28 bear against the cylindrical bearing surfaces of the recesses in the pillars 17, 18, for the support members 23. In this way the work holder 1 is firmly and sturdily supported in the carriage 2.

The shaft 22 carries a knob 29 at its other extremity, and the shaft 21 carries two double-cams 30 for actuating a pair of micro-switches 31 mounted upon the bed-plate 3. The free end of the shaft 21 carries a stop member 32 having arms 33, 34 (FIG. 4), adapted respectively to engage stops 35, 36 or 37, 38 carried by a frame member 39, mounted on the bed-plate 3, according to the position of the carriage 2 on the bed-plate 3. The stops 35, 36 or 37, 38, in conjunction with the stop member 32 constitute means for locating the work holder 1 in two predetermined angular positions in which the windows 7 at one or the other side of the holder, are brought to an upwardly facing position thus presenting the surfaces 8 of the golf balls for working.

The carriage further includes locking means comprising a plunger 40 mounted within the pillar 17 for extension through the base plate 20 of the carriage to engage one or the other of two spaced apertures 41 in the bed-plate 3. The plunger 40 is spring-urged away from the bed-plate 3 by a compression spring 42 disposed therearound so that a cam follower 43 secured to the plunger or forming part thereof, is maintained in engagement with a cam track 44 formed in the shaft 21.

Finally, the bed-plate 3 includes main stops 45, 46, positioned respectively to be engaged by the end of the shaft 21 and the base of the pillar 18. Also a recess 47 is provided in one rail 14 for engagement by a catch 48 pivotally mounted to the pillar 18 and urged outwardly by a spring 49, an extension of the catch 48 constituting a lever arm 50 on which a handle 51 is mounted whereby the catch 48 may readily be disengaged from the recess 47.

The work support above described is intended to be used for simultaneous marking of two golf balls, on opposite faces and moreover, with two distinct marking operations, e.g. in different colours on each face 8 to be marked. For this purpose, two marking positions of the carriage are provided for together with the loading and unloading position. These positions are defined by the main stops 45, 46 and the releasable intermediate stop constituted by the catch 48 and recess 47. The intermediate position of the carriage and the limiting position defined by the stop 45 are the marking positions of the carriage and in such positions one or other of the double-cams 30 is in operative relationship to the micro-switches 31. The other main limiting position of the carriage 2 defined by the stop 46 provides the loading and unloading position. It will be noted that the intermediate stop is effective only in one direction and the sequence of movements of the carriage will therefore be from the loading and unloading position defined by the main stop 46, to the first marking position defined by main stop 45, thence to the second marking position defined by the intermediate stop and then back to the unloading position defined by stop 46 after release of the intermediate stop by movement of the handle 51 to disengage the catch 48 from the recess 47.

To charge the work holder the two balls are fitted into the cups 10 in part 5, the pattern of the dimples 10 and indentations 12 serving to locate the balls uniquely therein. The part 4 is then placed over the balls and the holder is mounted in the carriage by insertion of the pair of lugs 13 at each end thereof into the slots 24 provided therefor in the support members 23 which are orientated so that the open ends of the slots face upwardly and are, therefore, accessible through the openings 25 into the mounting recesses provided in the pillars 17, 18. The work holder then serves to link the two shafts 21, 22 together for rotation by means of the knob 29.

The cam track 44 in shaft 21 is shaped so that the plunger is only withdrawn within the pillar when the slots 24 are upwardly faced and hence the carriage can only be moved on the bed-plate with the slots in this position in which the work holder is orientated so that the windows 8 therein face horizontally i.e. at right angles to the position shown in FIGS. 1 and 2. Only when the plunger is in alignment with the apertures 41 can the knob 29 be rotated to turn the work holder so that the windows 8 face upwardly. The apertures 41 are so disposed along the length of the bed-plate that the plunger is in alignment therewith when the carriage is in the marking positions defined by the main stop 45 and intermediate stop 47, 48. Thus rotation of work holder is possible in these positions only. The work holder will be rotated first in one direction and then in the other to the two predetermined angular positions defined by stop member 32 and stops 35, 36 or 37, 38 to present in turn the opposite surfaces 8 of the balls 9 for marking. Moreover, the plunger 40 and apertures 41 by their engagement serve to lock the carriage 2 relative to the bed-plate 3 while marking takes place.

The double-cams 30 are so orientated on the shaft 21 that rotation of it to the limiting angular positions, i.e. the marking positions, actuates the micro-switches 31 which can thus be employed to cause the marking press to operate automatically once the work-piece is correctly positioned for marking.

FIGS. 7 and 8 illustrate a modified form of the work support shown in FIGS. 1 to 7. In FIGS. 7 and 8 like reference numerals are used for parts identical to those of FIGS. 1 to 6 previously described.

The embodiment of FIGS. 7 and 8 differs from that previously described firstly in that a stop member 52 is provided which extends radially of a collar 53 mounted on shaft 22 for rotation therewith. Two stops 54, 55 are fixedly secured to a mounting block 56 carried by the pillar 18. The stops 54, 55 lie in the path of the stop member 52 and serve to define two predetermined angular positions of the shaft 22 and hence of the work holder 1, in which the windows 7 at one or the other side of the holder are brought to the operative position for marking to take place. The stop member 52 and stops 54, 55 thus serve the same purpose as and replace the stop member 32 and stops 35, 36, 37 and 38 of the embodiment of FIGS. 1 to 6.

The embodiment of FIGS. 7 and 8 also includes ejector mechanism which comprises a rectangular frame 57 embracing and pivoted to the pillar 18 at 58 about midway along the length of the two longer side frame members 59. The shorter end frame members are constituted by bars 60, 61. Bar 60 lies within a transverse open slot 62 in the intermediate members 19 midway along the length of the holder 1 and bar 61 is disposed between the shaft 22 and the bed-plate 3 (not shown in FIGS. 7 and 8).

The central portion of bar 60 has a shallow groove 63 formed therearound whose shape in transverse section is arcuate and of a radius equal to that of the work holder 1 so that the bar 60 can engage the periphery of the work holder 1 over an appreciable distance. The base of the slot 62 lies sufficiently below the base of the bearing surface 27 for the work holder 1 to accommodate the bar 60 below the work holder 1.

By pivoting the ejector frame 57 clockwise as seen in FIG. 7 the bar 60 can be brought into contact with the work holder 1 to lift it to the dot-and-dash position shown in the drawings from which it can be readily removed by hand for recharging with golf balls. The provision of this ejector mechanism by facilitating the removal of the work holder 1 increases the output of the work support.

Although two preferred embodiments have been described in detail, it is to be understood that modifications and alterations thereto can be made within the scope of the invention. Thus, for example, other forms of work holder may be employed for one or more articles, as also may different means for mounting the holder in the carriage where a removable work holder is to be provided.

I claim:
1. A work support for use in conjunction with a marking press including a base plate, a carriage movably mounted on said base plate, a work-piece holder, said work-piece holder being adapted to support a three-dimensional work-piece for a marking operation on at least two surface areas thereof spaced around its periphery, means rotatably mounting said holder on said carriage to enable each peripheral area of said work-piece to be brought in turn into position for marking, and means defining positions of the carriage on the base plate corresponding to at least one marking position and a position for loading and unloading the work-piece holder, locking means actuatable consequent upon rotation of the work-piece holder to its marking positions whereby in such positions the carriage is locked relative to the base plate.

2. A work support as claimed in claim 1 in which said locking means comprises a cam-operated spring-biased plunger, recesses being provided in said base plate to receive said plunger.

3. A work support as claimed in claim 2, in which said recesses in the base plate are provided only at positions corresponding to the marking positions of the carriage.

4. A work support for use in conjunction with a marking press, including a two-part openable work-piece holder, said parts having at least one pair of complementary recesses formed therein to receive therebetween a work-piece to be marked, the bases of said recesses each having an apertur therethrough providing access to the surface area of the work-piece to be marked whereby at least two peripherally-spaced areas of said work-piece can be marked through the said apertures in the holder parts, means rotatably mounting said holder in said support so as to enable each said peripheral area to be presented in turn for marking through said apertures in said holder, and means for locating the work holder in predetermined angular positions corresponding to the marking positions of the work-piece.

5. A work support as claimed in claim 4, in which said work holder is adapted to receive therewithin at least two work-pieces, at least two apertures being provided in said holder for each work-piece through which marking can take place, corresponding apertures being aligned for simultaneous marking of the articles supported in said holder.

6. A work support as claimed in claim 4 in which each holder part is segmental in cross-section so that the holder is substantially cylindrical, and including a semi-cylindrical bearing surface for the work holder.

7. A work support as claimed in claim 6 in which the work-piece is removable from the work support for loading and unloading and including an ejector bar movable within a transverse slot in said semi-cylindrical bearing surface for said holder between a retracted position and a position partially displacing said holder from said support.

8. A work support for use in conjunction with a marking press including a two-part separable work-piece holder, said parts having at least two pairs of complementary spherical recesses therein to support therebetween at least two spherical work-pieces to be marked, the bases of said recesses each having an aperture therethrough to provide access for marking therethrough to two substantialy diametrically-opposite peripheral areas of each work-piece, means removably and rotatably mounting said holder in said support so as to enable each said peripheral area to be presented in turn for marking through said apertures in said holder, and means for locating the work holder in predetermined angular positions corresponding to the marking positions of the workpiece.

9. A work support as claimed in claim 8 including ejector mechanism for initiating removal of said holder from the work support.

10. A work support for use in conjunction with a marking press including a bed-plate, a carriage movably mounted on said bed-plate, a work-piece holder adapted to support a work-piece for a marking operation on at least two spaced peripheral areas thereof, means rotatably mounting said holder on said carriage to enable each peripheral area to be presented in turn for marking, means for locating the work holder in predetermined angular positions corresponding to the marking positions for said areas, further means defining two positions of the carriage on the bed-plate corresponding respectively to a marking position within a marking press and a position for loading and unloading the work-piece holder, means preventing rotation of said work-piece holder except when said carriage occupies either of said two positions thereof on said bed-plate, locking means for locking said carriage relative to said bed-plate when said holder is turned to its predetermined angular positions and electrical switch means actuatable consequent upon rotation of the work holder to said predetermined angular positions thereof, whereby rotation of the work support to said positions can be employed automatically to operate a marking press.

References Cited in the file of this patent
UNITED STATES PATENTS

| | | |
|---|---|---|
| 1,599,918 | O'Hara | Sept. 14, 1926 |
| 1,633,536 | McGinness | June 21, 1927 |
| 1,921,571 | Jones | Aug. 8, 1933 |
| 1,953,992 | Seagers | Apr. 10, 1934 |
| 1,999,647 | Atti | Apr. 30, 1935 |
| 2,002,847 | Atti | May 28, 1935 |
| 2,124,179 | Atti | July 19, 1938 |
| 2,541,358 | Hirsch | Feb. 13, 1951 |

FOREIGN PATENTS

| | | |
|---|---|---|
| 716,884 | Great Britain | Oct. 13, 1954 |